(12) United States Patent
Albrecht et al.

(10) Patent No.: US 7,449,660 B2
(45) Date of Patent: Nov. 11, 2008

(54) PORTABLE WIRE FEED SYSTEM FOR A WELDER

(75) Inventors: Bruce Albrecht, Grayslake, IL (US); Dave Stanzel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 330 days.

(21) Appl. No.: 11/015,969

(22) Filed: Dec. 17, 2004

(65) Prior Publication Data

US 2006/0131292 A1 Jun. 22, 2006

(51) Int. Cl.
*B23K 9/12* (2006.01)
(52) U.S. Cl. .................................. 219/137.2
(58) Field of Classification Search ............. 219/137.2, 219/137.7, 137.71, 136
See application file for complete search history.

(56) References Cited

U.S. PATENT DOCUMENTS

| 2,778,910 | A | * | 1/1957 | Landis et al. | 219/137.31 |
| 3,217,136 | A | * | 11/1965 | Anderson | 219/137.2 |
| 3,242,310 | A | * | 3/1966 | Bosteels | 219/137.2 |
| 3,538,309 | A | * | 11/1970 | Welker | 219/386 |
| 3,619,553 | A | * | 11/1971 | Wilkens et al. | 219/137.7 |
| 4,552,323 | A | * | 11/1985 | Otis | 242/594.3 |
| 5,634,604 | A | * | 6/1997 | Cooper | 242/128 |
| 7,017,742 | B2 | * | 3/2006 | Dragoo et al. | 206/408 |
| 7,126,084 | B2 | * | 10/2006 | DeYoung | 219/136 |

FOREIGN PATENT DOCUMENTS

| CH | 344494 | 2/1960 |
| DE | 10100164 | 8/2001 |
| EP | 0468953 | 1/1992 |
| JP | 5-254727 | * 10/1993 |

* cited by examiner

*Primary Examiner*—Kevin P Kerns
(74) *Attorney, Agent, or Firm*—Ziolkowski Patent Solutions Group, SC

(57) ABSTRACT

The present invention is directed to a system for supplying a portable source of a consumable weld wire to a weld. The system includes a container having a length of consumable wire disposed therein and a wire drive assembly connectable thereto. The container may be a pail or bucket, and has an open end. The wire drive assembly has a base constructed to connect about the open end of the container. The wire drive assembly delivers the consumable weld wire from the container to a torch configured for welding-type applications. A system for supplying consumable wire such as herein disclosed is easily transportable, reusable, and functionally useful with many known welding devices.

30 Claims, 3 Drawing Sheets

PORTABLE WIRE FEED SYSTEM FOR A WELDER

BACKGROUND OF THE INVENTION

The present invention relates generally to welding, and more particularly to a system for feeding consumable weld wire to a welder. Specifically, the invention includes an enclosure, having a consumable weld wire contained therein, and a drive assembly which connects to an end of the enclosure for feeding the consumable weld wire for a welding-type process.

Versatile welding type devices are desirable for high output industrial applications such as those commonly found in machine shops, manufacturing facilities, and ship yards. A typical welding system generally includes a torch apparatus, a power source, a drive assembly, and, if required, a gas cylinder to supply shielding gas. Usually, such a system includes a supply of consumable weld wire that is supplied to a weld application by the drive assembly. The drive assembly is often positioned on or adjacent to the torch apparatus and feeds wire from the wire source through the apparatus. Specifically, when the tip of the welding torch is positioned proximate to a grounded workpiece, or the welding wire comes into contact with the workpiece, an electrical current passes through the welding wire and the workpiece causing the welding wire to be heated and melt. As a gap is formed between the weld wire and the weld, an electrical arc is established which causes the welding wire to continue to melt thereby transferring the material of the weld wire to the weld. The material of the workpiece and the weld wire then fuse and cool, thereby forming a relatively homogeneous bond therebetween. As the welding torch is translated across the workpiece, melted weld wire is continuously transferred to the workpiece as long as a torch trigger is depressed and weld wire is available. If the welding process requires a shielding gas, gas is provided to the welding torch from a gas cylinder.

As noted, in industrial applications, wire drive assemblies are commonly disposed at or near the weld torch of a welding type device. These assemblies typically receive consumable wire from a large container or drum having a considerable amount of consumable weld wire spooled therein. The distance the torch can be operated from the source of the consumable weld wire is partly determined by the ability of the wire feeder to push or pull the consumable wire from the consumable wire source to the torch. That is, certain wire feeders cannot feed consumable weld wire over extensive distances between the source of consumable wire and the torch. As such, welding-type applications wherein the welding-type process occurs in relatively close proximity to the source of consumable weld wire can be equipped with an extensive, continuous supply of weld wire. However, such systems have limited portability and therefore a limited range of weld operation between the torch and the source of weld wire.

For many industrial applications, consumable weld wire is often stored in large drums or containers known as "bulk packs" or "payoff packs." These storage devices are typically large, awkward, and heavy, and therefore, are not easily moved by an individual without resorting to the aid of forklifts or the like. As a result, although such bulk sources of consumable wire provide consumable weld wire to a welding-type process for extended periods, they require more operational time to replenish and render the welding-type system non-transportable from an original position.

Additionally, the size of such sources of consumable weld wire detracts from the portability of such sources. These sources of consumable weld wire are generally not maneuverable in small spaces, such as the narrow walkways of manufacturing facilities or the manways of ships. Often, the bulk sources of consumable weld wire either cannot fit into small work spaces, cannot be easily maneuvered into and within the confined spaces, or the equipment necessary to move the bulk sources cannot fit therein.

Furthermore, typical bulk weld wire containers are constructed to be durable against wear for a number of months of exposure in an industrial operating environment. However, these containers often break down or are damaged due to harsh conditions and use. As such, the containers require periodic replacement, repair, or disposal. To make such storage devices more durable would require them to become heavier, larger, and more expensive to replace thereby detracting from their use based on a cost/benefit analysis.

Although there are other welding systems wherein the source of consumable wire is easily transportable, these types of systems often only have a very limited supply of consumable weld wire. The limited supply of consumable weld wire requires an operator to frequently replenish the supply of welding wire in order to continue welding applications. These systems generally use a "spool" of weld wire wound about a bobbin. Although such systems are highly transportable, they detract from welding-process efficiency by frequently requiring changing of the spool. Frequently changing the spool of consumable weld wire requires stopping system operations to change the source of consumable wire, thereby detrimentally affecting operation efficiency.

Further, the operator must carry as many spools as may be needed, or risk having to return for more spools. Carrying many spools is inconvenient and difficult while moving the welder. Additionally, the bobbin of a consumed spool of wire is often merely discarded. While the relatively small spools of wire are more easily transported to and maneuvered about a workplace, repeatedly discarding spool bobbins creates excessive waste. Furthermore, transporting excessive bobbins of weld wire exposes each of the containers of weld wire to the conditions of the workplace. These more transportable sources of weld wire are often provided in either cardboard boxes or a bag-type container. When exposed to the harsh conditions of the workplace and repeatedly moved thereabout, these containers can, and often do, become damaged and contaminate the weld wire contained therein with the contaminants of the workplace. As such, without an adequate container, entire spools of weld wire can become contaminated or damaged such that the entire spool or a significant portion thereof can become unsuitable for welding-type applications.

It would therefore be desirable to have a source of consumable weld wire that is movable by an unaided operator and provides consumable weld wire for extended intervals of weld operation. Additionally, it would further be desirable to provide a consumable weld wire container that is rugged, reusable, and recyclable to prevent unnecessary generation of operational waste.

BRIEF DESCRIPTION OF THE INVENTION

The present invention provides a system and method for providing consumable weld wire to a weld that overcomes the aforementioned drawbacks. Specifically, the invention is a portable wire feeding device having an extended supply of consumable weld wire attached thereto. The consumable weld wire is fed to a torch from a portable container by the wire feeding device. The wire feeding device is removable from the container and may be reused with multiple containers or various types of containers.

In accordance with one aspect of the invention, a consumable weld wire delivery system is disclosed. The system comprises an enclosure having a handle attached thereto which is constructed to allow unaided transport by a person. The enclosure also has an opening at one end connectible to a drive assembly and a sealed other end. An extended length of consumable weld wire is disposed within the enclosure to allow continual extraction through the opening of the enclosure by the drive assembly.

In accordance with another aspect of the invention, a wire supply for a welding-type device is disclosed. The wire supply is comprised of a container having a weld wire spooled therein and a wire feeder mounted about an end of the container. The wire feeder is configured to feed the weld wire to a torch.

In accordance with another aspect of the present invention, a welding type system is disclosed. The welding type system includes a power supply, a welding apparatus, a bucket having a length of weld wire disposed therein, and a wire feeding device connected to the bucket and configured to feed wire from the bucket to a torch upon demand by the torch.

In accordance with yet another aspect of the present invention, a method is disclosed for providing a consumable wire to a weld. The method comprises the steps of providing a transportable bucket of spooled weld wire, removing a lid from the bucket of spooled weld wire, connecting a removable drive assembly to the bucket, and feeding weld wire from the bucket by the drive assembly to a weld.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention is directed to welding, and more particularly, to a system of providing consumable weld wire to a weld. The invention generally includes a wire supply system comprised of a pail-type enclosure or bucket and a wire drive assembly engageable therewith. The pail-type enclosure has a consumable weld wire disposed therein and the wire drive assembly connects to an end thereof. The wire drive assembly is constructed to deliver the consumable weld wire to a torch connectable to the wire drive assembly.

Figure 1:
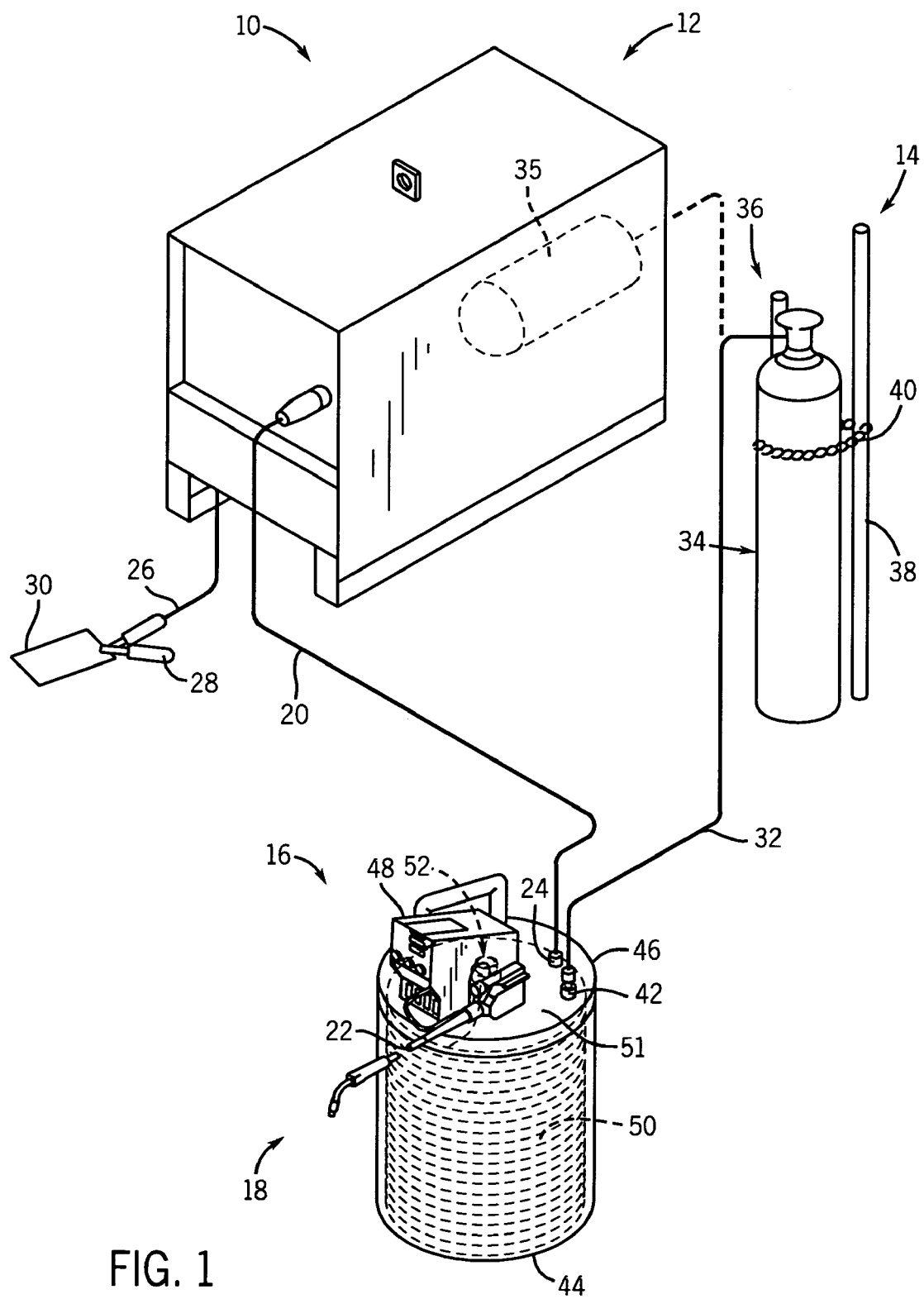
FIG. 1 is a perspective view of one embodiment of a welding system incorporating the present invention.

Referring now to FIG. 1, a welding system 10 includes a power source 12, a gas supply 14, a wire drive device 16, and a weld torch 18. Power source 12 is constructed to generate an electrical signal suitable for welding-type applications. Wire drive device 16 is electrically connected to the power source 12 via power cable 20. Weld torch 18 is connected to the wire drive device 16 via weld cable 22. Power cable 20 connects power source 12 to wire drive device 16 at power connection 24, and may deliver either a positive power signal or a negative power signal depending upon a desired welding process. Cable 26, a ground cable, also extends from power source 12 and has a clamping member 28 at an end thereof. Alternatively, cable 26 could be connected to wire drive device 16 with another cable extending between power source 12 and wire drive device 16. Clamping member 28 is constructed to connect cable 26 to a workpiece 30.

Gas supply 14 includes a gas hose 32 which supplies gas for a welding process from gas cylinder 34 to wire drive device 16. Gas cylinder 34 has a regulator and flow meter 36 connected thereto and, as shown in FIG. 1, is maintained in an upright position via structure 38 and chain 40. Alternatively, gas cylinder 34 can be constructed to be transported with wire drive device 16. Gas hose 32 from gas cylinder 34 is connected to a gas interface or adapter 42 positioned on a base or plate 46 of the wire drive device 16. Alternatively, gas hose 32 can be connected directly to a motor assembly, or drive assembly 48, of wire drive device 16. Regardless of the position of gas cylinder 34 or point of connection with wire drive device 16, gas supply 14 is constructed to supply a shielding gas to torch 18. As another alternative, gas may be supplied from an optional internal gas supply 35, shown in phantom, via hose 32.

Wire drive device 16 includes a weld wire enclosure or container 44, a base 46, and drive assembly 48. In one embodiment, weld wire container 44 may be a bucket or pail, similar to a common plastic five gallon bucket. It is equally understood that container 44 could be formed from other materials such as metal, or enclose other volumes. It is further understood that the enclosure could have a variety of cross-sectional shapes such as circular, square, polygonal, or any equivalent thereof. The container 44 has an extended length of weld wire 50, shown in phantom, disposed therein.

Base 46 is secured about weld wire container 44 such that weld wire 50 may be continually drawn from weld wire container 44 through base plate 46 and fed to drive assembly 48. Drive assembly 48 is secured to a top surface 51 of the base plate 46 so as to be generally aligned with an aperture 52, shown in phantom, of base plate 46 though which weld wire 50 passes to drive assembly 48 and, therefrom, to torch 18. Wire drive device 16, including drive assembly 48 and consumable weld wire 50 positioned in container 44, is constructed such that an unaided, individual operator may transport the system about and through generally confined or restricted spaces.

Figure 2:
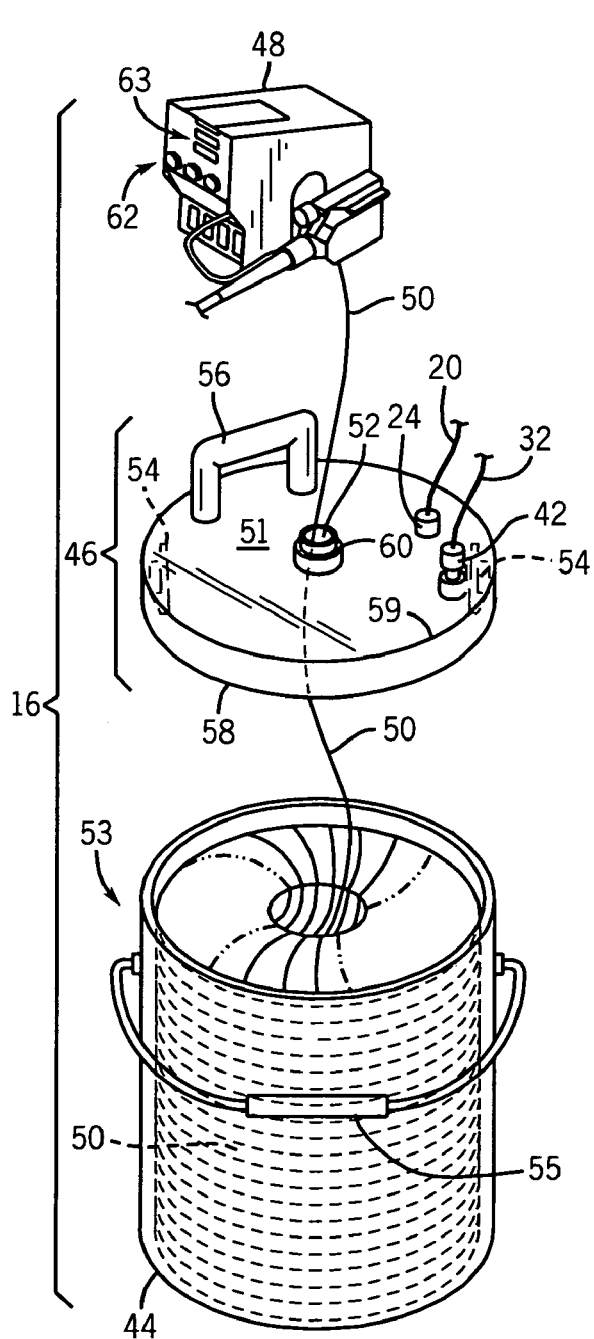
FIG. 2 is an exploded view of a wire feeding system of the welding system shown in FIG. 1.

Referring now to FIG. 2, an exploded view of wire drive device 16 is shown. Container 44 has a length of consumable weld wire 50 disposed therein. Preferably, weld wire 50 is in a spooled arrangement to allow non-binding extraction, although weld wire 50 may be disposed in any dispensable arrangement and may be of any suitable gauge or type. At a minimum, wire 50 is disposed within container 44 so that wire 50 may be dispensed from container 44 during a welding process, eliminating the need to remove all of the wire from container 44 prior to the commencement of a welding application. The amount of weld wire 50 disposed within container 44 may vary, but preferably container 44 contains enough weld wire 50 to allow for extended periods of welding-type processes. Weld wire container 44 is constructed so that, once the length of weld wire 50 has been consumed, container 44 may be easily refilled and reused, or simply discarded. Container 44 is further constructed of a suitable material to be durable enough to withstand extended periods of exposure to a typical industrial environment. Container 44, having weld wire 50 disposed therein, is provided with a conventional lid (not shown) when not in use. The lid is constructed to sealingly engage the enclosure and protect the weld wire from contaminants such as dirt, debris, dust, and moisture which may be associated with a work environment. Upon intended use of the weld wire contained in container 44, the conventional lid is removed and replaced with base 46 of wire drive device 16 thereby maintaining the integrity and quality of the weld wire contained in container 44.

Container 44 also has a handle 55 attached thereto. Handle 55 is constructed to allow an individual to transport container 44 and its contents without the need for assistance, such as forklifts or the like. That is, handle 55 attached to container 44 allows an unaided individual to easily transport or move container 44 when base plate 46 is not attached.

Still referring to FIG. 2, base plate 46, shown removed from weld wire container 44, is shaped to snugly fit about an open end 53 of container 44. Base plate 46 is removably secured to weld wire container 44 by snap lock tabs 54. Although snap lock tabs 54 are shown disposed on base 46, it is equally understood that snap lock tabs 54 can be disposed about opening 53 of container 44 to engage and affix base plate 46 thereto. Alternatively, it is equally understood that base plate 46 can be attached to weld wire container 44 by any of one or more straps, one or more clamps, one or more locking feet, one or more grasping hooks, or any combination or alternative thereof.

A handle 56 is connected to top surface 51 of base plate 46 so that an individual operator can easily transport wire drive device 16 with container 44 and weld wire 50 therewith. Additionally, it is recognized that base plate 46 is constructed to be attached to a variety of enclosure configurations. That is, base plate 46 is not limited to connection with an enclosure having a specific configuration.

Base plate 46 of wire drive device 16 includes a side wall or lip 58 extending generally perpendicularly from a perimeter 59 of the top surface 51. Lip 58 is constructed to snuggly engage container 44 about opening 53 and secure, with tabs 54, base plate 46 of wire feed device 16 thereto. An aperture 52 and torch mount, or grommet 60, are formed in top surface 51 of base plate 46 and allow weld wire 50 to pass therethrough. As shown, grommet 60 extends beyond top surface 51 of base plate 46. It is understood that grommet 60 may be generally flush with top surface 51 of base plate 46 and constructed to receive a corresponding boss extending from drive assembly 48 therein. Grommet 60 is constructed to allow drive assembly 48 to be snap fitted thereto. Alternatively, it is understood that grommet 60 may be threaded so that drive assembly 48 may be screwed into position relative to grommet 60. Adapter 42 is connected to base plate 46 and is constructed to fluidly connect, as shown in FIG. 1, wire drive device 16 via hose 32 to gas cylinder 34. Referring back to FIG. 2, power connection 24 is formed in base plate 46 of wire drive device 16 and, as shown in FIG. 1, electrically connects wire drive device 16 to power source 12.

Also shown in FIG. 2, drive assembly 48 is shown removed from base plate 36. Drive assembly 48 is configured to be removably secured over grommet 60, and to allow passage of consumable weld wire 50 through aperture 52. Drive assembly 48 snap fittingly engages grommet 60, and includes a motor or similar device (not shown) therein which delivers weld wire from container 44 through grommet 60 to a torch. The torch is connected to drive assembly 48 such that consumable weld wire 50 and shielding gas are delivered to a welding process from wire drive device 16. Drive assembly 48 may include a number of controls 62 and displays 63, such as jog/purge push buttons, an ON/OFF switch, or other knobs or controls, that are used by an operator to control weld parameters such as wire feed rate, weld power, shielding gas flow rate, or other similar operating parameters. Alternatively, it is equally understood that such controls may be incorporated into base plate 46 of wire drive device 16.

Figure 3:
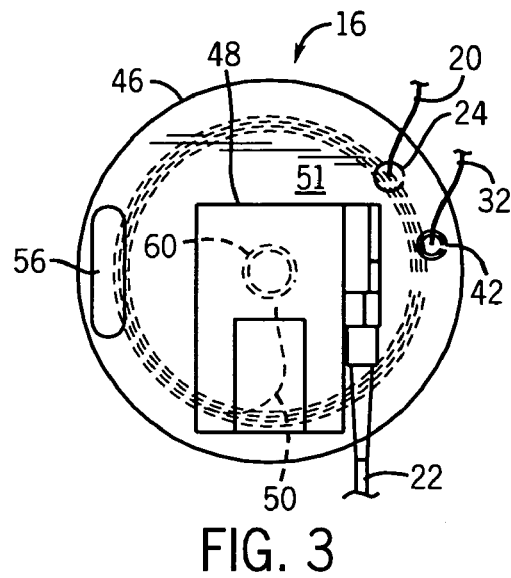
FIG. 3 is a plan view of the wire feeding system shown in FIG. 2.

Referring now to FIG. 3, drive assembly 48 is attached to base plate 46 generally about grommet 60, shown in phantom, to receive weld wire 50, also shown in phantom, through base plate 46 from container 44. Weld wire 50 is spooled within container 44 with an end extending through grommet 60 to drive assembly 48. Gas hose 32 is attached to adapter 42 of wire drive device 16, and power cable 20 from the power source is attached to power connection 24 of base plate 46. Handle 56 extends from the top surface 51 of base plate 46, generally to one side of base plate 46, and allows uninterrupted connection of drive assembly 48 thereto.

Figure 4:
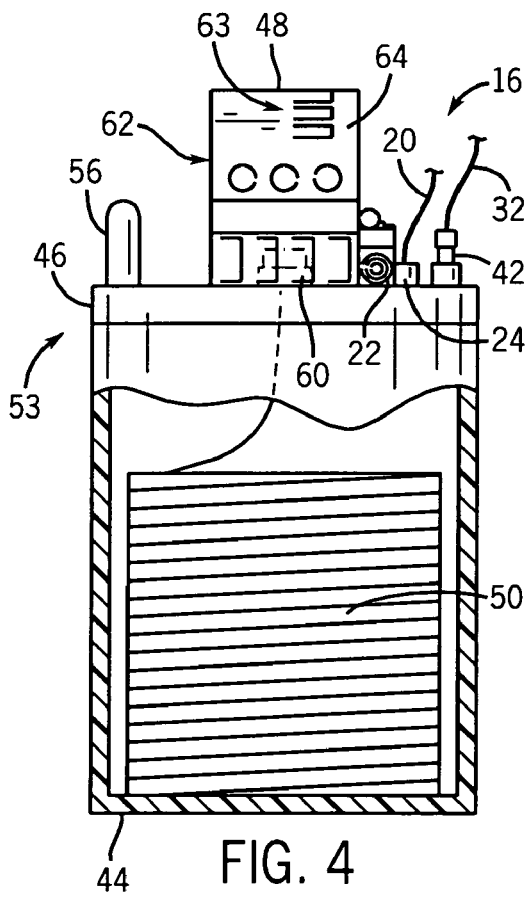
FIG. 4 is an elevational view of the wire feeding system shown in FIG. 2 with the container in partial broken view exposing the consumable weld wire contained therein.

In FIG. 4, a portion of container 44 is removed to show weld wire 50 spooled therein. Weld wire 50 is shown spooled inside container 44, with an end of the wire extending upward from the spool, through grommet 60, shown in phantom, to drive assembly 48. Base plate 46 of wire drive device 16 is secured about an opening 53 of container 44 and sealingly connects thereto. Drive assembly 48 is positioned about grommet 60, shown in phantom, thereby securing drive assembly 48 to container 44. Control knobs 62 are shown on a face 64 of drive assembly 48, with weld cable 22 extending therefrom.

Figures 5, 6:
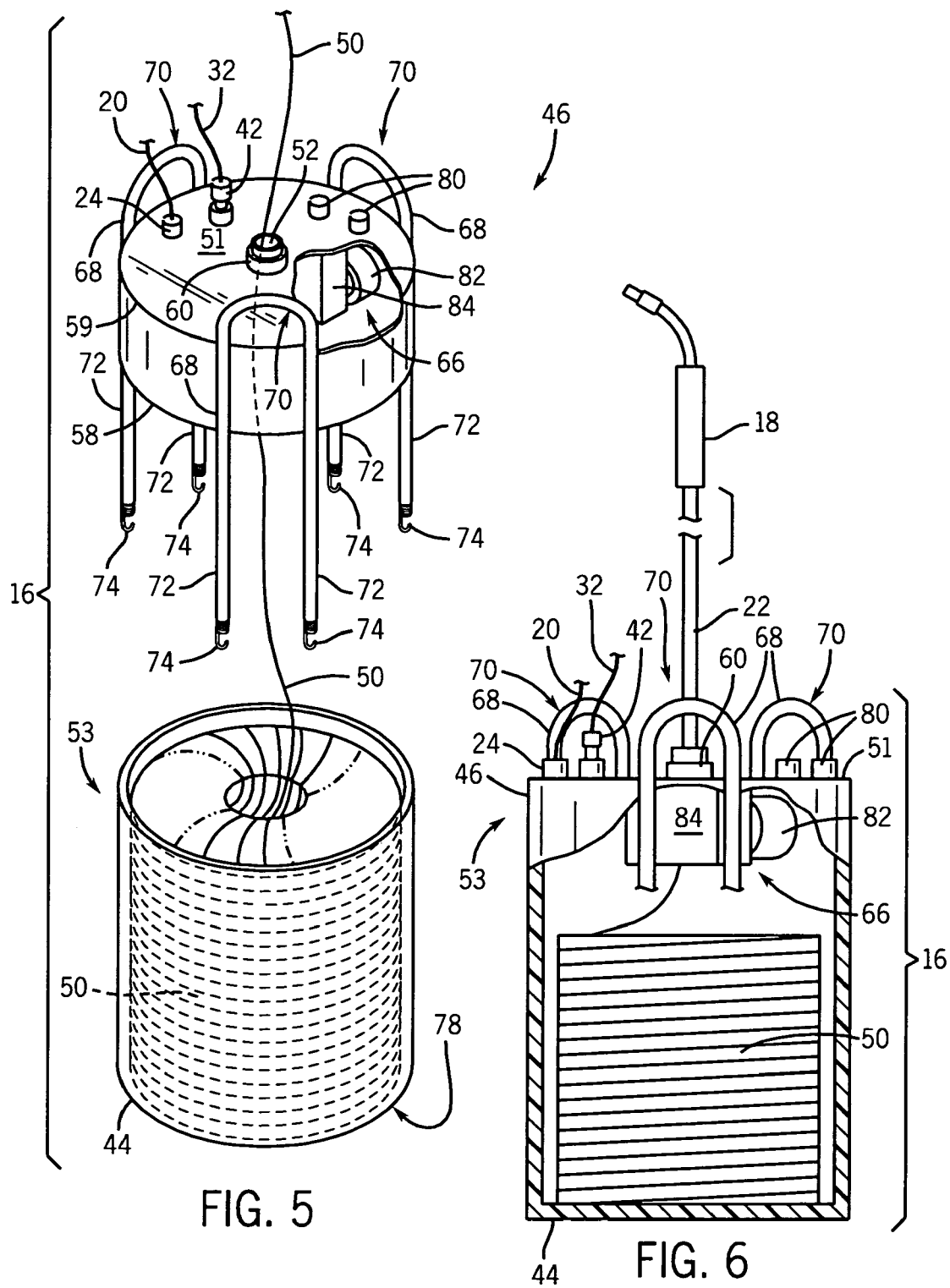
FIG. 5 is perspective view of another embodiment of the present invention with a welding-type device removed from a source of weld wire.
FIG. 6 is an elevational view of the welding-type device shown in FIG. 5 with the weld wire container shown in partial cross-section.

Referring now to FIG. 5, an alternative embodiment of the present invention is shown. Wire drive device 16 is comprised of container 44, base 46, and internal drive assembly 66. Container 44 has a length of consumable weld wire 50 disposed therein. Weld wire 50 may be in a spooled arrangement and is dispensed from container 44 for continuous extraction during a welding application.

Base 46 is shaped to have a generally flat upper surface 51, and a side wall or lip 58 extending perpendicularly from perimeter 59. Power connection 24 and gas interface 42 are formed on top surface 51 for connection with power cable 20 and gas hose 32. Additionally, control knobs 80 are also formed on base 46, preferably on top surface 51. Control knobs 80 allow a user to adjust welding parameters, such as wire speed. Aperture 52 and grommet 60 are formed in top surface 51 of base 46 to allow weld wire 50 to pass therethrough and be fed to torch 18, FIG. 6. Grommet 60 is configured to securely receive weld cable 22 of torch 18, as shown in FIG. 6.

Still referring to FIG. 5, an alternative method of securing base 46 to container 44 is shown. Base 46 is shown with three extended handles 68. It is recognized, however, that base 46 may have more or fewer handles. Each handle 68 is preferably formed in a U-shape, comprising a curved upper portion 70 and two legs 72. At the ends of legs 72, are gripping hooks 74 which are constructed to securely attach base 46 to container 44. When base 46 is placed in position over container 44, an operator may extend gripping hooks 74 about the bottom surface 78 of container 44. When released, hooks 74 tightly engage against the bottom surface 78 of container 44, thus securing base 46 in place.

Internal drive assembly 66 is attached to base 46 beneath top surface 51. As can be seen, when base 46 is connected to container 44, internal drive assembly 66 is disposed inside container 44. Internal drive assembly 66 is comprised of a motor 82 and a wire feed interface 84. Weld wire 50 is inserted from container 44 into wire feed interface 84, through aperture 52 and grommet 60, to torch 18, FIG. 6. Motor 82 operates to push or drive the wire 50 from the container 44 to torch 18, upon request from torch 18. The speed at which motor 82 drives wire 50 to torch 18 is variable by a user, preferably via control knobs 80.

Referring now to FIG. 6, the alternative embodiment of FIG. 5 is shown assembled. Base 46 is secured about open end 53 of container 44. Base 46 is attached to container 44 via hooks 74, FIG. 5, of handles 68, FIG. 6. Thus, when base 46 is secured to container 44, wire 50 is substantially protected from contaminants such as dirt, debris, dust, and moisture which may be associated with a work environment. Handles 68 extend beyond top surface 51 of base 46 to provide several convenient surfaces 70 for an unaided operator to grasp and transport wire drive device 16.

As internal drive assembly 66 is attached to the underside of top surface 51 of base 46, internal drive assembly 66 is disposed within container 44 when base 46 and container 44 are attached. Thus, motor 82 and wire feed interface 84 are visible when container 44 is shown in broken view. As shown, wire 50 is inserted into wire feed interface 84 and fed by motor 82 through grommet 60. Weld cable 22 is attached to grommet 60 and torch 18 receives wire 50 therethrough. An operator may use control knobs 80 to control the voltage level supplied to torch 18 during a welding process and the speed at which wire 50 may be fed to torch 18.

It is further contemplated that container 44 could alternatively be used simply as a convenient transport device for weld wire, which in turn could be taken out and used with other drive assemblies for a welding process. In another alternative embodiment, container 44 may be distributed with a conventional lid containing a funnel-like dispensing device such that weld wire could be dispensed to conventional wire feeders directly from container 44. Additionally, base 46 may be attached to container 44 with drive assembly 48 or 66 removed therefrom such that grommet 60 functions as a dispensing device to dispense weld wire 50 to other known drive assemblies or wire feeders. Alternatively, if an operator performing a welding process consumed the entirety of the consumable weld wire contained in the container, and had no replacement containers of consumable weld wire, an end of a weld wire from an alternative source could be fed through grommet 60 of base plate 46, to drive assembly 48, and to a torch. Gas hose 32 could be attached to a gas adapter of drive assembly 48 and the operator could continue weld operations with an alternate source of weld wire while using the drive assembly of the present invention. Or, alternatively, an end of a weld wire from an alternative source could be fed through drive assembly 66 then through grommet 60 to a torch, and an operator could similarly continue weld operations. Thus, the wire drive device disclosed is adaptable and functionally interconnectible with many known welding systems, including robotic, automated, or portable welding systems. Additionally, a welding-type device according to either embodiment of the present invention provides a highly transportable, one-person movable, source of weld wire that can withstand extended exposure to workplace environments and is lighter to transport than what are commonly known as suitcase wire feeders.

Therefore, in accordance with one embodiment of the present invention, a consumable weld wire delivery system is provided. The consumable weld wire delivery system includes an enclosure having at least one handle attached thereto and constructed to allow unaided transport by a person, an opening at one end connectable to a drive assembly, and a sealed other end. An extended length of consumable weld wire is disposed within the enclosure to allow continual extraction through the opening of the enclosure by the drive assembly.

According to another embodiment of the present invention, a wire supply for a welding-type device is disclosed. The wire supply comprises a container having a weld wire spooled therein, and a wire feeder. The wire feeder is mounted about an end of the container and configured to feed the weld wire to a torch.

In accordance with yet another embodiment of the present invention, a welding type system is provided which includes a power supply, a welding apparatus, a bucket, and a wire feeding device. The bucket has an extended length of weld wire disposed therein, and the wire feeding device is connected to the bucket and configured to feed wire from the bucket to a torch upon demand by the torch.

According to a further embodiment of the present invention, a method is disclosed for providing a consumable wire to a weld. The method comprises the steps of providing a transportable bucket of spooled weld wire, removing a lid from the bucket of spooled weld wire, connecting a removable drive assembly to the bucket, and feeding weld wire from the bucket by the drive assembly to a weld.

The present invention has been described in terms of the preferred embodiment, and it is recognized that equivalents, alternatives, and modifications, aside from those expressly stated, are possible and within the scope of the appending claims.

What is claimed is:

1. A consumable weld wire delivery system comprising:
   an enclosure having at least one handle attached thereto and constructed to allow unaided transport by a person, the enclosure having an opening at one end to allow removably mounting a drive assembly thereon and a closed other end, wherein the enclosure is a bucket; and
   an extended length of consumable weld wire disposed within the enclosure to allow continual extraction through the opening of the enclosure by the drive assembly.

2. The system of claim 1 wherein the drive assembly is constructed to deliver the consumable weld wire to a weld.

3. The system of claim 2 wherein the drive assembly is removably connectable to the enclosure by at least one of a strap, a snap lock, a grasping hook, or a securing clamp.

4. The system of claim 3 wherein the drive assembly further comprises a base configured to snugly engage the open end of the enclosure, the base having an opening formed therein configured to allow the consumable weld wire to pass therethrough.

5. The system of claim 4 wherein the base of the drive assembly further comprises at least one of a torch mount, a gas valve interface, a power cable interface, control knobs, and at least one support handle.

6. The system of claim 4 wherein the drive assembly further comprises at least one of a wire feed interface and a wire feed motor attached to the base and generally aligned with the opening formed therethrough.

7. The system of claim 4 wherein the enclosure is substantially sealed from atmosphere to limit water and debris entry when the base of the drive assembly is attached thereto.

8. The system of claim 1 incorporated into a welding device having a power source configured to generate a power signal suitable for welding-type applications.

9. The system of claim 8 wherein the welding device and the weld wire delivery system are transportable by a single person.

10. A wire supply for a welding-type device, the wire supply comprising:
a hand-liftable container having a weld wire spooled therein; and
a wire feeder mounted about an end of the hand-liftable container and configured to feed the weld wire to a torch, wherein the wire feeder further comprises a motor assembly and a base, the base configured to snugly engage an end of the container and having an opening formed therein configured to allow the weld wire to pass therethrough.

11. The wire supply of claim 10 wherein the container is constructed to be refillable and allow reuse.

12. The wire supply of claim 10 wherein the wire feeder is removably attached to the container.

13. The wire supply of claim 10 wherein the base of the wire feeder further comprises at least one of a torch mount, a gas valve interface, a power cable interface, a support handle, and has at least one of a strap, a_snap lock, a grasping hook, or a securing clamp to removably attach the base to the container.

14. The wire supply of claim 10 incorporated into a welding device having a power source configured to generate a power signal suitable for welding-type applications.

15. The wire supply of claim 14 constructed to allow repositioning by an unaided individual.

16. A welding type system comprising:
a power supply;
a welding apparatus;
a bucket having a handle;
an extended length of weld wire disposed in the bucket; and
a wire feeding device connected to the bucket and configured to feed wire from the bucket to a torch upon demand by the torch.

17. The welding type system of claim 16 wherein the wire feeding device is attachable to the bucket by at least one of a strap, at least one snap lock, at least one hook, and at least one securing clamp.

18. The welding type system of claim 16 wherein the bucket is disposable.

19. The welding type system of claim 16 wherein the wire feeding device further comprises a motor assembly and a base, the base configured to snugly engage an end of the bucket and the base having an opening formed therein configured to allow the weld wire to pass therethrough.

20. The welding type system of claim 19 wherein the base further comprises at least one of a torch mount, a gas adapter, a power cable interface, and a support handle.

21. A method for providing a consumable wire to a weld, the method comprising:
providing a transportable bucket of spooled weld wire;
distributing the bucket of spooled weld wire with a removable lid;
providing a removable drive assembly connectable to the bucket; and
forming an opening in a base of the drive assembly through which weld wire is capable of being fed from the bucket by the drive assembly to a weld.

22. The method of claim 21 further comprising attaching at least one of a torch mount, a gas valve interface, a secondary cable interface, and a support handle to the base of the drive assembly.

23. The method of claim 21 further comprising the step of incorporating the bucket and drive assembly into a welding-type system having a remotely positioned power source configured to generate a power signal suitable for welding-type applications.

24. A consumable weld wire delivery system comprising:
an enclosure having at least one handle attached thereto and constructed to allow unaided transport by a person, the enclosure having an opening at one end to allow removably mounting a drive assembly thereon and a closed other end; and
an extended length of consumable weld wire disposed within the enclosure to allow continual extraction through the opening of the enclosure by the drive assembly, wherein the drive assembly is constructed to deliver the consumable weld wire to a weld, and wherein the drive assembly is removably connectable to the enclosure by at least one of a strap, a snap lock, a grasping hook, or a securing clamp.

25. The system of claim 24 wherein the drive assembly further comprises a base configured to snugly engage the open end of the enclosure, the base having an opening formed therein configured to allow the consumable weld wire to pass therethrough.

26. The system of claim 25 wherein the base of the drive assembly further comprises at least one of a torch mount, a gas valve interface, a power cable interface, control knobs, and at least one support handle.

27. The system of claim 25 wherein the drive assembly further comprises at least one of a wire feed interface and a wire feed motor attached to the base and generally aligned with the opening formed therethrough.

28. The system of claim 25 wherein the enclosure is substantially sealed from atmosphere to limit water and debris entry when the base of the drive assembly is attached thereto.

29. The system of claim 24 incorporated into a welding device having a power source configured to generate a power signal suitable for welding-type applications.

30. A wire supply for a welding-type device, the wire supply comprising:
a hand-liftable container having a weld wire spooled therein; and
a wire feeder mounted about an end of the hand-liftable container and configured to feed the weld wire to a torch, wherein a base of the wire feeder further comprises at least one of a torch mount, a gas valve interface, a power cable interface, a support handle, and has at least one of a strap, a snap lock, a grasping hook, or a securing clamp to removably attach the base to the container.

* * * * *